(12) United States Patent
Thelen et al.

(10) Patent No.: US 7,682,085 B2
(45) Date of Patent: Mar. 23, 2010

(54) ROTOR BEARING ARRANGEMENT FOR A BALANCING MACHINE

(75) Inventors: Dieter Thelen, Modautal (DE); Andreas Mueller, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 104 days.

(21) Appl. No.: 11/884,740

(22) PCT Filed: May 12, 2006

(86) PCT No.: PCT/EP2006/062282

§ 371 (c)(1),
(2), (4) Date: Aug. 21, 2007

(87) PCT Pub. No.: WO2006/120249

PCT Pub. Date: Nov. 16, 2006

(65) Prior Publication Data

US 2008/0260311 A1    Oct. 23, 2008

(30) Foreign Application Priority Data

May 13, 2005    (DE) .................. 10 2005 023 086

(51) Int. Cl.
*F16C 35/00* (2006.01)
(52) U.S. Cl. .............................. 384/438; 73/471; 73/473
(58) Field of Classification Search ................. 384/100, 384/192, 193, 195, 196, 199, 200, 215, 438–444; 248/580, 603; 403/220, 223, 225, 226, 227; 73/471, 473, 475
See application file for complete search history.

(56) References Cited

U.S. PATENT DOCUMENTS

| | | | | |
|---|---|---|---|---|
| 1,095,797 A | * | 5/1914 | Brantingham | .................. 74/87 |
| 2,329,654 A | | 9/1943 | Rouy | |
| 2,461,645 A | * | 2/1949 | Kallmann | .................. 73/465 |
| 2,751,262 A | | 6/1956 | Federn et al. | |
| 2,869,936 A | * | 1/1959 | Federn | .................. 384/215 |
| 2,932,482 A | * | 4/1960 | Dickie | .................. 248/619 |
| 3,075,619 A | * | 1/1963 | McCandliss | .................. 188/379 |
| 3,754,801 A | * | 8/1973 | Giers et al. | .................. 384/428 |
| 4,035,037 A | * | 7/1977 | Cunningham | .................. 384/12 |
| 4,449,407 A | * | 5/1984 | Curchod | .................. 73/462 |

(Continued)

FOREIGN PATENT DOCUMENTS

| | | |
|---|---|---|
| DE | 302 061 | 8/1916 |
| DE | 388 737 | 1/1924 |
| DE | 880 509 | 7/1953 |
| DE | 1 240 343 | 5/1967 |
| DE | 28 54 838 | 7/1980 |

(Continued)

OTHER PUBLICATIONS

International Search Report.

*Primary Examiner*—Thomas R Hannon
*Assistant Examiner*—Phillip Johnson
(74) *Attorney, Agent, or Firm*—Collard & Roe, P.C.

(57) ABSTRACT

In a rotor bearing arrangement for a balancing machine having a bearing housing (1) which is supported in a radially resilient manner in a highly stiff bearing stand (2) by means of at least two identically configured and arranged spring elements, the spring elements are arranged on opposite sides of the bearing housing (1) so as to be symmetrical about a plane containing the main axis of the bearing and the bearing stand (2) has two supporting arms (11) arranged at a distance from one another, between which the bearing housing (1) is arranged and on which the spring elements are supported.

7 Claims, 3 Drawing Sheets

U.S. PATENT DOCUMENTS

Figure 1:
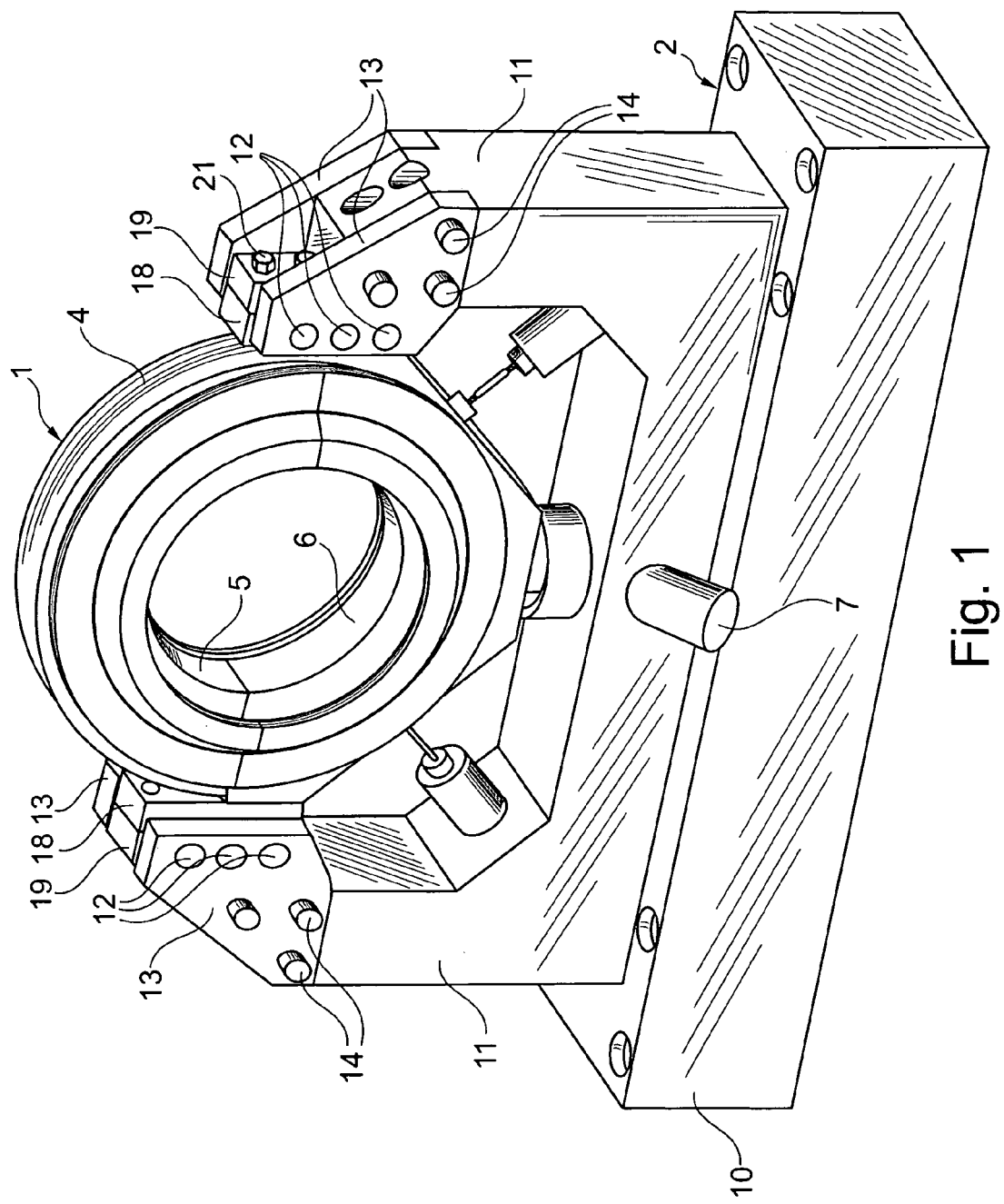

| | | | | |
|---|---|---|---|---|
| 4,671,676 A | * | 6/1987 | Chen et al. | 384/100 |
| 4,726,690 A | * | 2/1988 | Thelen | 384/99 |
| 4,905,515 A | * | 3/1990 | Himmler | 73/471 |
| 5,600,062 A | * | 2/1997 | Moench | 73/462 |
| 6,091,177 A | * | 7/2000 | Carbonell et al. | 310/91 |
| 6,628,027 B2 | * | 9/2003 | Fuller | 310/91 |

FOREIGN PATENT DOCUMENTS

| | | |
|---|---|---|
| DE | 37 16 210 | 12/1988 |
| EP | 0 192 789 | 9/1996 |
| GB | 963714 | 7/1964 |
| GB | 1 350 522 | 4/1974 |
| GB | 2037445 | 7/1980 |

* cited by examiner

ROTOR BEARING ARRANGEMENT FOR A BALANCING MACHINE

CROSS REFERENCE TO RELATED APPLICATIONS

Applicants claim priority under 35 U.S.C. §119 of German Application No. 10 2005 023 086.5 filed May 13, 2005. Applicants also claim priority under 35 U.S.C. §365 of PCT/EP2006/062282 filed May 12, 2006. The international application under PCT article 21(2) was not published in English.

The invention relates to a rotor bearing arrangement for a balancing machine having a bearing housing which is supported in a radially resilient manner in a highly stiff bearing stand by means of two similarly configured and arranged spring elements.

In configuring a rotatable bearing arrangement for balancing, in particular, shaft elastic rotors, it is necessary to standardize the influence of the stiffness of the bearing arrangement in directions radial to the bearing main axis, about which the rotor is rotatable, and also to allow flexibility of the bearing about its center to compensate for deflections of the rotor.

A bearing arrangement of the type mentioned at the outset is known from DE 1 240 343 and satisfies these requirements by having two similarly configured bearing support systems, the lines of action of which meet at the bearing center and which are arranged in a vertical plane and at an angle of 45° to the vertical in a rigid bearing stand. Each bearing support system consists of two pairs of springs formed by rod springs which support the bearing housing on a base plate, and consist of a coil spring acting as a resilient element which is arranged between the base plate and the bearing stand. For stabilization the bearing support systems also have leaf springs which extend at right angles to the axes of the rod springs and guide the base plate resiliently on the bearing support. In addition the bearing housing is supported on the bearing stand in the direction of the main axis of the bearing by means of coil springs. This known configuration is very complex and costly, and has approximately equal stiffness only in the horizontal and vertical radial directions, but not in radial directions deviating therefrom.

The object of the invention is to provide a rotor bearing arrangement of the type mentioned at the outset with improved isotropic support of the bearing housing distinguished by low construction costs.

The object is achieved by the invention described in claim 1. Advantageous embodiments of the invention are described in the dependent claims.

According to the invention, the spring elements are arranged on opposite sides of the bearing housing so as to be symmetrical about a plane containing the main axis of the bearing, and the bearing stand has two supporting arms arranged at a distance from one another, between which the bearing housing is arranged and on which the spring elements are supported.

The invention is based on the finding that, in order to achieve equally stiff support of the bearing housing in the horizontal and vertical directions, it is necessary to support the spring elements in, or symmetrically about, the axial plane associated with the respective direction with a very high stiffness comparable to the stiffness of the base. Only this can eliminate flexural influences which counteract isotropic behavior in the known bearing supports. According to the invention the stiffness of the bearing stand should be considerably, in particular at least ten times, greater than the stiffness of the support of the bearing housing formed by the spring elements.

The spring elements of the bearing arrangement according to the invention may be configured in different ways. A configuration of the spring elements as flexural rods which extend parallel to the main axis of the bearing and are thus resiliently loaded radially to their longitudinal axis is particularly advantageous. In conjunction with such a configuration of the spring elements, the bearing arrangement according to the invention is completely isotropic, and this is very advantageous for operating a balancing machine, in particular for balancing shaft elastic rotors.

The bearing housing is advantageously supported on each supporting arm of the bearing stand by means of two flexural rods which are arranged at a distance from one another. This considerably increases the torsional strength of the support of the bearing housing and counteracts the production of torsional oscillations about an axis which connects the support points on opposing sides of the bearing housing. In addition, the number of flexural rods arranged on opposing sides of the bearing housing may be varied according to the desired stiffness of the support. If, for example, sockets are provided on the bearing housing and on the supporting arms for three flexural rods, it is possible to achieve three different levels of stiffness with a single configuration of the flexural rods. A further variation is achieved by using flexural rods with differing levels of stiffness.

For receiving the flexural rods, the supporting arms have at their ends carrier plates, which are arranged so as to be parallel and symmetrical about the center plane of the bearing at right angles to the main axis of the bearing and which accommodate the ends of the flexural rods in holes parallel to the main axis of the bearing, the flexural rods bridging gaps between the carrier plates. A further advantageous embodiment is achieved by combining the flexural rods and the carrier plates at their ends to form an integral component. In order to support the bearing housing on the flexural rods, pairs of clamping plates are provided, which are fixed to the bearing housing and between which the center portions of the flexural rods are clamped.

According to a further proposal of the invention, there is arranged in the bearing housing a bearing ring, which has a bearing bore for receiving the rotor, has a spherical surface, and is rotatably mounted in a bearing surface, which is spherical in relation to the center point of the bearing, of the bearing housing. This allows the rotor axis to move about a transverse axis of the bearing arrangement and allows precession of the rotor axis. In order to reduce friction the spherical bearing arrangement of the bearing ring arranged in the bearing housing may be configured as a hydrostatic plain bearing.

Figure 2:
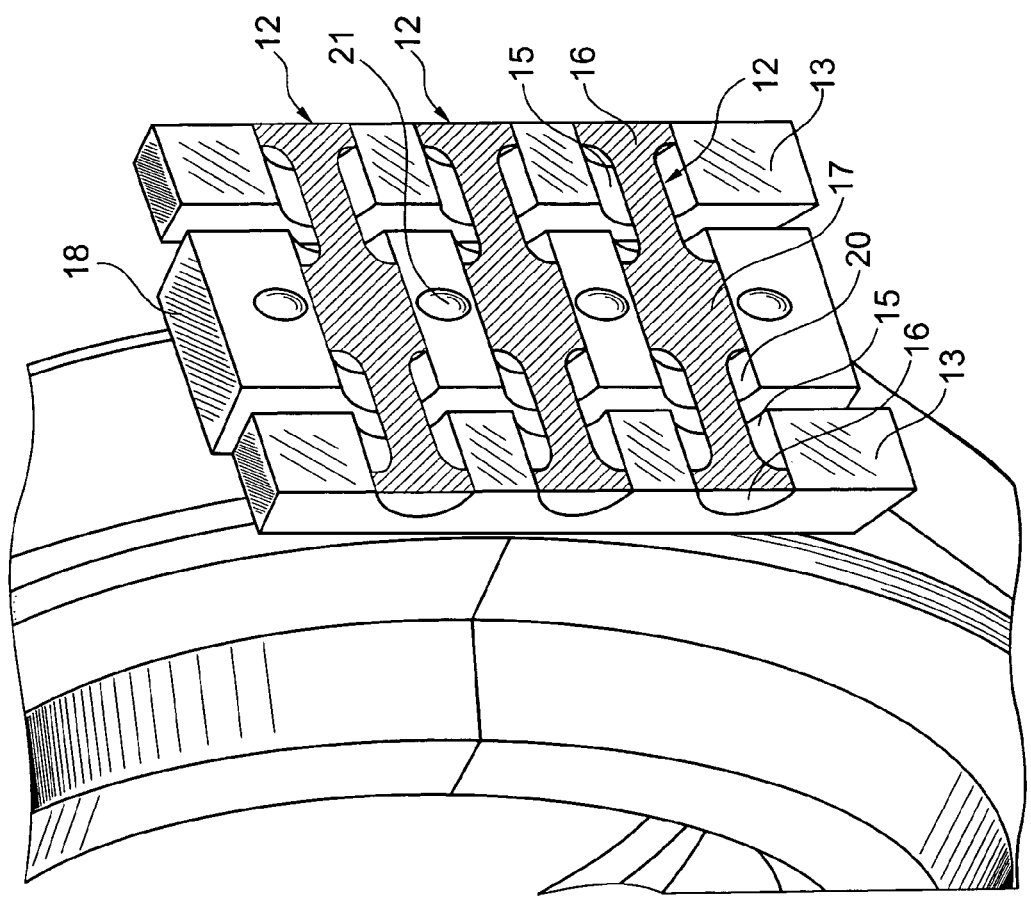
Figure 3:
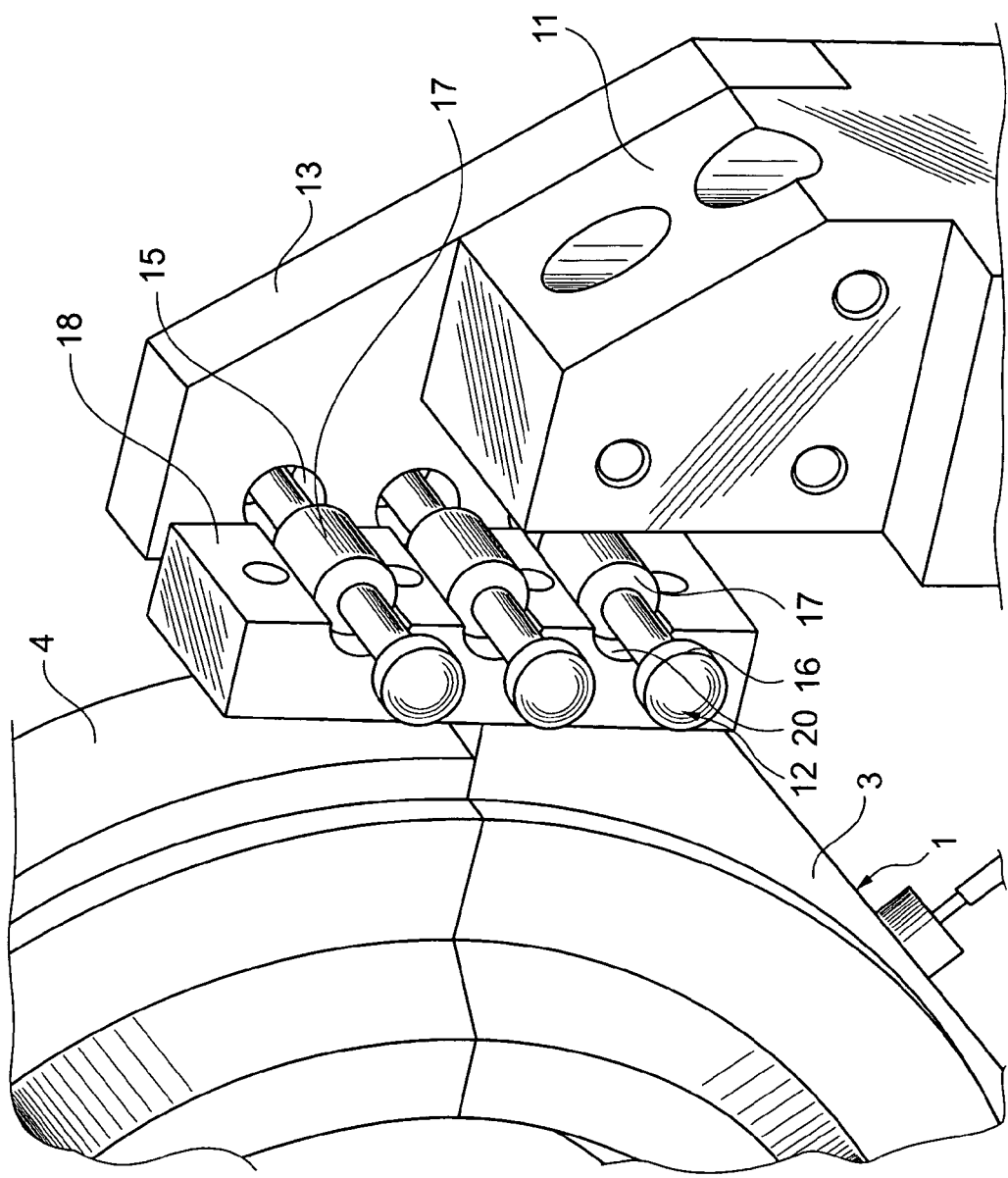

The invention will be explained in greater detail with reference to an embodiment shown in the drawings, in which:

FIG. 1 is a perspective view of a rotor bearing arrangement according to the invention, FIG. 2 is a cross-section through the socket for the spring elements of the rotor bearing arrangement according to FIG. 1, and FIG. 3 is a perspective view of the sockets for the spring elements of the rotor bearing arrangement according to FIG. 1 after individual parts have been removed.

The rotor bearing arrangement shown comprises a bearing housing 1 and a bearing stand 2, in which the bearing housing 1 is supported in a radially resilient manner. In a horizontal center plane of the bearing containing the main axis of the bearing, the bearing housing 1 is divided into a lower housing half 3 and an upper housing half 4. The upper housing half 4 may be lifted off to insert a rotor in the bearing housing 1. In the bearing housing 1 there is located a similarly divided bearing ring 5, which has a cylindrical bore 6 for receiving the rotor to be mounted and has a spherical surface. The bearing housing 1 has a spherical inner surface, in which the spherical surface of the bearing ring 5 is mounted so as to be displaceable about the center point of the bearing. The bearing arrangement of the bearing ring 5 is configured as a hydrostatic bearing arrangement, the bearing housing having bearing pockets, which are arranged symmetrically on both sides of the radial bearing center plane normal to the main axis of the bearing and which can be connected to a pressure medium source. At its foot the bearing housing 1 has an outlet 7 for the pressure medium escaping from the gaps in the hydrostatic bearing arrangement.

The bearing stand 2 has a solid pedestal 10 which is determined to be fixed to a base. On its upper side the pedestal 10 has two parallel supporting arms 11, which extend perpendicularly upwards until approximately the center of the bearing housing 1 which is arranged in the gap between the supporting arms 11. The bearing housing 1 is supported on the supporting arms 11 by spring elements in the form of flexural rods 12. For this purpose, two carrier plates 13, which are arranged at a distance from one another and are arranged parallel to the radial bearing center plane, are fixed on the end of each supporting arm 11 by means of screws 14. The carrier plates 13 each project into the gap between the supporting arms 11 and have in their free portions three holes 15 respectively, which are parallel to the main axis of the bearing and in which the flexural rods 12 are held. The axes of the holes 15 each lie in a vertical plane parallel to the main axis of the bearing, and the holes 15 are arranged so as to be symmetrical about the horizontal bearing center plane. Since the carrier plates 13 each have three holes 15 in the embodiment shown, the axes of the center holes each lie in the horizontal bearing center plane and the axes of the other holes each lie parallel to and at an identical interval from said center hole. It is also possible, however, to provide an even number of receiving holes in the carrier plates. In this case the holes are respectively arranged symmetrically on either side of the horizontal bearing center plane.

Referring to FIGS. 2 and 3, the flexural rods 12 have end portions 16 with a larger diameter, with which they are held in the holes 15 by means of, for example, an interference fit. The flexural rods 12 also have a center portion 17 with a larger diameter which serves to support the bearing housing. In order to secure the bearing housing on the center portions 17, there is provided on both sides of the bearing housing 1 a respective pair of parallel clamping plates 18, 19 which are arranged in the gap between the free portions of the carrier plates 13 and at a distance therefrom, and which have the partially cylindrical recesses 20 for receiving the center portions 17 of the flexural rods 12. The clamping plates 18 are rigidly connected to the lower housing half 3 of the bearing housing 1 such that the cylinder axes of their central recesses 20 lie in the horizontal bearing center plane. In order to clamp the middle portions 17 in the recesses 20, the clamping plates 18, 19 associated with one another are fixed together by means of screws 21.

In the view as shown in FIG. 3 the frontal carrier plate and the clamping plate 19 are removed to ensure that the configuration of the flexural rods 12 and their sockets can clearly be seen.

The arrangement and configuration of the flexural rods 12 allows the bearing housing 1 to be supported in a radially resilient manner on the bearing stand 2, the support having equal stiffness in all radial directions, i.e. the support being isotropic. To this end, it is a requirement that the support of the flexural rods 12 on the supporting arms 11 of the bearing stand 2 have much greater stiffness in all radial directions than the stiffness of the support of the bearing housing 1 by the flexural rods 12. Thus the stiffness of the supporting arms 11 of the bearing stand 2 should be at least ten times greater than the stiffness of the support of the bearing housing 1 formed by the flexural rods 12.

The described rotor bearing arrangement is particularly suitable for balancing shaft elastic rotors. The spherical bearing arrangement of the bearing ring which receives the rotor allows the rotor to move about a transverse axis and allows the rotor axis to move in a precessional manner without causing constraining forces in the support. The isotropic stiffness of the bearing arrangement prevents splitting of the natural frequency of the rotor and, in so doing, simplifies balancing. A further advantage of the rotor bearing arrangement described is that the stiffness of the bearing arrangement can easily be adapted to differing requirements, by varying the number of flexural rods used for supporting the bearing housing.

The arrangement of the flexural rods parallel to the rotor axis allows the described rotor bearing arrangement to absorb forces in the axial direction with negligible impairment of its bearing properties, and this is advantageous for many balancing tasks. In addition, the parallel arrangement of the flexural rods causes the support to be highly torsion resistant, so bearing forces of the spherical bearing arrangement do not lead to torsional oscillations of the bearing housing.

The described rotor bearing arrangement is further distinguished by having a simple and inexpensive construction. In comparison to the known solutions, only a few resilient elements are required and the constructional configuration of the individual components of the bearing arrangement do not require any complex manufacturing processes. In addition, the configuration of the bearing stand 2 allows the outflow of the pressure medium for lubrication of the bearing to be well positioned in the center underneath the bearing housing 1. The described configuration also provides suitable installation space between the bearing housing 1 and the pedestal 10 of the bearing stand 2 for the arrangement of the oscillation pickups. In this position the oscillation pickups are protected by the surrounding components and do not disrupt the fitting and removal of a rotor into and from the bearings.

The invention claimed is:

1. Rotor bearing arrangement for a balancing machine comprising a bearing housing which is supported in a radially resilient manner in a highly stiff bearing stand by means of at least two similarly configured and arranged spring elements, wherein the spring elements are arranged on opposite sides of the bearing housing so as to be symmetrical about a plane containing the main axis of the bearing, wherein the bearing housing stand has two supporting arms arranged at a distance from one another and forming a gap in-between wherein the bearing housing is arranged in said gap between the supporting arms, and wherein each spring element is a flexural rod which is supported on a respective supporting arm, the flexural rods extend parallel to the main axis of the bearing housing and radially support the bearing housing along a longitudinal axis of the flexural rods.

2. Rotor bearing arrangement according to claim 1, wherein the stiffness of the bearing stand is considerably greater than the stiffness of the support formed by the spring elements of the bearing housing.

3. Rotor bearing arrangement according to claim 1, wherein the bearing housing is supported on each supporting arm of the bearing stand by means of two flexural rods which are arranged at a distance from one another.

4. Rotor bearing arrangement according to claim 1, wherein the supporting arms comprise carrier plates at ends of the supporting arms, wherein the carrier plates are arranged parallel and symmetrical about a center plane of the bearing housing at right angles to the main axis of the bearing housing, and wherein the carrier plates accommodate end portions of the flexural rods in holes parallel to the main axis of the bearing housing, and wherein the flexural rods bridge gaps between the carrier plates.

5. Rotor bearing arrangement according to claim 1, further comprising pairs of clamping plates which are fixed on the bearing housing wherein center portions of the flexural rods are clamped between said pairs of clamping plates.

6. Rotor bearing arrangement according to claim 1, wherein in the bearing housing there is arranged a bearing ring, which has a bearing bore for receiving the rotor, has a spherical outer surface, and is mounted in a spherical bearing surface of the bearing housing so as to be rotatable with respect to a center point of the spherical bearing surface of the bearing housing.

7. Rotor bearing arrangement according to claim 6, wherein the spherical bearing arrangement of the bearing ring is formed as a hydrostatic plain bearing.

* * * * *

UNITED STATES PATENT AND TRADEMARK OFFICE
CERTIFICATE OF CORRECTION

PATENT NO.        : 7,682,085 B2                                         Page 1 of 1
APPLICATION NO.   : 11/884740
DATED             : March 23, 2010
INVENTOR(S)       : Thelen et al.

It is certified that error appears in the above-identified patent and that said Letters Patent is hereby corrected as shown below:

In particular, in Column 4, line 51, (Line 7 of Claim 1) after the word "bearing" (first occurrence) please add:
--housing--.

In Column 4, line 52, (Line 8 of Claim 1) before the word "stand" please delete the word:
--housing--.

Signed and Sealed this

Twenty-fifth Day of May, 2010

David J. Kappos
*Director of the United States Patent and Trademark Office*